United States Patent [19]
Meyer

[11] 3,847,183
[45] Nov. 12, 1974

[54] CLOSURE

[76] Inventor: Vincent Edwin Meyer, 114 W. Maiden Ln., Monroe, Conn. 06468

[22] Filed: Nov. 22, 1972

[21] Appl. No.: 308,660

[52] U.S. Cl. .......................... 138/96 R, 174/DIG. 8
[51] Int. Cl. ............................................ B65d 59/06
[58] Field of Search ..... 138/89, 96 R, 96 T, DIG. 7, 138/174; 215/38 A; 174/138 F, DIG. 8; 285/381; 156/84, 85, 86

[56] References Cited
UNITED STATES PATENTS

| | | | |
|---|---|---|---|
| 3,037,529 | 6/1962 | Hancik | 138/DIG. 7 |
| 3,448,182 | 6/1969 | Derbyshire et al. | 174/DIG. 8 |
| 3,620,896 | 11/1971 | Glasgow | 156/85 |
| 3,668,754 | 6/1972 | Boast | 285/381 |
| 3,713,463 | 1/1973 | Bywater, Jr. | 138/89 |
| 3,741,422 | 6/1973 | Wold et al. | 215/38 A |

Primary Examiner—Charles A. Ruehl

[57] ABSTRACT

A closure is formed of a polymeric composition exhibiting plastic memory. The closure comprises a substantially tubular member having at least one open end and the interior wall provided with a network of protuberances such as annular projecting ribs formed integrally with the closure. The closure is characterized by being capable of changing dimensions between a heat stable condition and a heat unstable condition.

7 Claims, 10 Drawing Figures

PATENTED NOV 12 1974 3,847,183

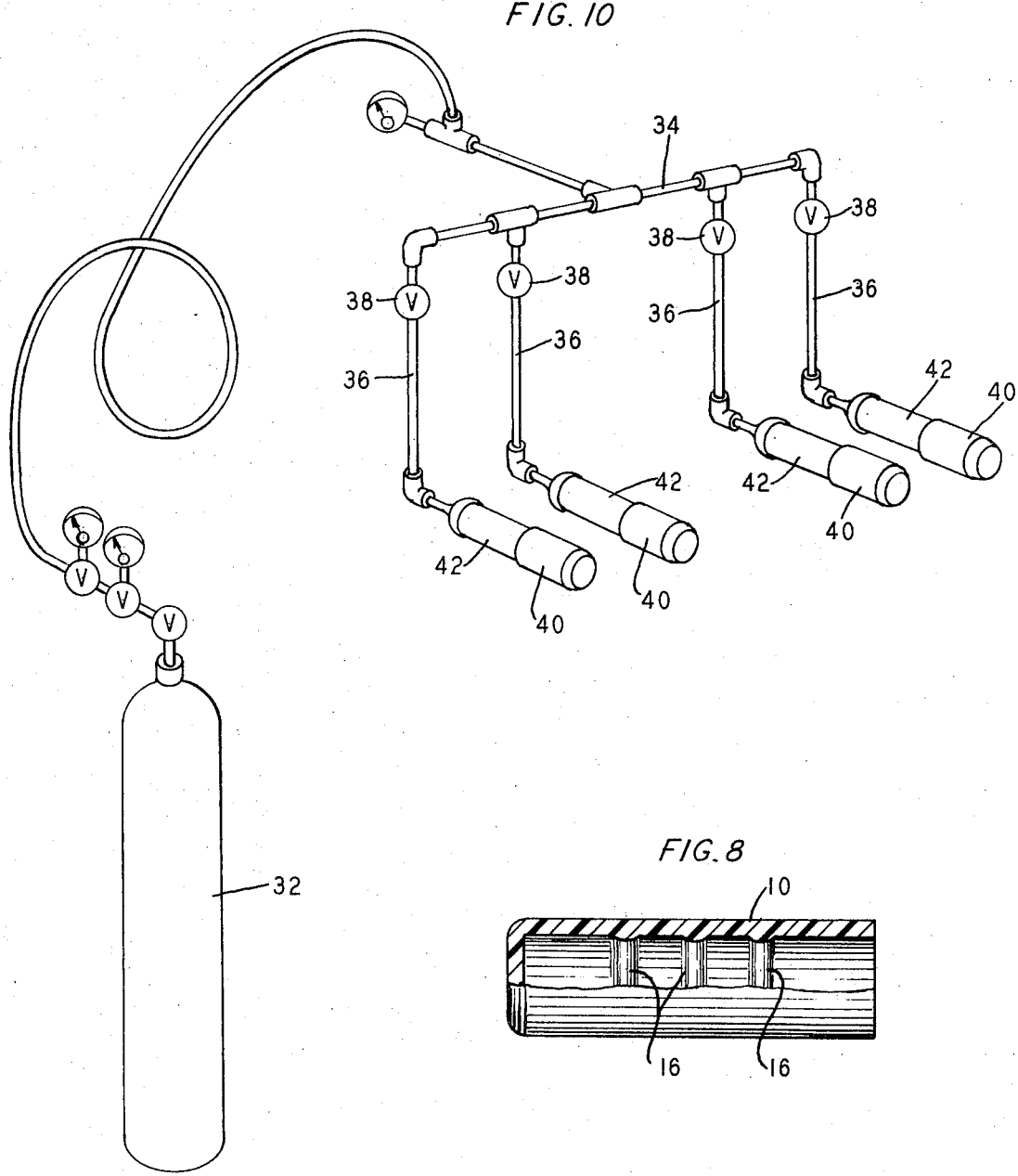

CLOSURE

This invention relates to a closure especially for cable. In its more specific aspect, this invention relates to a closure for a cable end or for a splice.

In the manufacture of cable, such as power cable, the conductor, which may be stranded, is provided with one or more layers of insulation. Usually a semiconducting layer or tape is first applied over the conductor, and a primary insulation layer is applied as by extrusion over this layer. Typically high voltage cable is provided with a ground shielding means, which usually comprises a semi-conducting layer and a metallic return shield. The cable structure may be enclosed by a jacketing material such as a plastic material or a metallic jacket. It is not uncommon to enclose two or more cable structures in a single jacket. The fabricated cable is then wound on a reel for storage and shipment.

Until the cable is actually installed by the user or customer, the ends of the cable must be protected from moisture. The layers surrounding the conductor are rarely, if ever, air tight, and when the ends of the cable come in contact with water, including moisture in the atmosphere, the water will traverse the cable for a considerable distance by capillary action. Obviously moisture in the cable is deleterious, and the length of cable permeated by water is damaged or ruined and must be discarded.

Similarly, when a cable is spliced, it is essential that the splice be air tight. If not, water may enter at the exposed ends and by capillary action permeate the cable.

In order to protect the cable from moisture penetration, an exposed part of the cable, e.g., the end or splice, is provided with a closure to seal the exposed portion. Thus, the cable end is provided with an end cap, and the spliced section is encased by a cylindrical sleeve. In this manner the cable is protected from moisture.

It is well known in the art that certain plastic compositions exhibit what is known as "memory". This is described, for example, in U.S. Pat. No. 2,027,962. These compositions include for example polyvinyl resins, polyolefins (including copolymers), polyamides, epoxy resins and polyurethanes. Where desired, polymer blends may be used. Thus a plastic article in a heat stable condition which has been distorted to a heat unstable condition will return to its last existing shape or size upon the application of heat above the heat distortion temperature or crystalline melting temperature of the plastic. Plastic compositions which exhibit this property of memory are especially suitable for the fabrication of a closure for cable.

End caps of cross-linked polyethylene are used extensively in the cable industry. The end cap is manufactured by first fabricating the polymer to the shape and size desired depending upon the diameter of the cable to be covered. The polymer is cross-linked chemically or by irradiation, and while hot is distorted or deformed to a larger size and then chilled by air or water so as to retain its expanded form. This expanded form is sometimes referred to as a preform. Upon the application of heat to the preform above the crystalline melting temperature of the polyethylene, the cap will return to its substantially original size.

The size end cap required will depend upon the size of the cable. The end cap must fit the cable snugly, and therefore the inside diameter of the cap should be slightly smaller than the diameter of the cable. The preform then is larger than the cable and slips easily over the end of the cable. When heat is applied to the end cap, as with a blow torch, the cap contracts to its original size and forms a tight fit over the end of the cable thereby protecting it from moisture.

In order to improve the grip of the end cap on the cable, the interior wall of the cap is provided with a suitable fusible or hot melt sealant such as a mastic. The sealant is applied to the preform in a separate operation. The sealant not only improves considerably the gripping action of the cap but also bridges the knicks or gaps in the insulation thereby insuring an air-tight grip. End caps of this type are described in U.S. Pat. No. 3,243,211. As pointed out above, the sealant must be applied to the preform in a separate operation which adds to the time and expense in the manufacture of the end cap. More importantly is the fact that the sealant deteriorates or degrades with the passage of time and thereby looses its sealing properties. The cable is frequently warehoused or stored in an open lot for long periods of time and the heat or sun may induce this degradation. When this phenomena occurs, the sealant actually performs as a lubricant and the end cap will slip. As a result, the cable end is no longer protected against moisture penetration.

A closure for a cable splice is fabricated as a substantially cylindrical tube. Here too, a preform is first manufactured and a sealant then applied. The preform is slipped over one cable end, the splice is made, and the preform slipped over the splice. Heat is applied to the preform to contract its size and fuse the sealant thereby sealing the splice and protecting it from moisture. The same disadvantages, however, exist here as with end caps.

This invention has therefore as among its objects to provide a closure especially useful for cable characterized by a substantially permanent grip and overcoming the disadvantages prevalent when a sealant is used.

The invention, together with its objects and advantages, will best be understood by referring to the following detailed specification, and to the accompanying drawings in which:

FIGS. 7 and 8 show alternative embodiments of the invention;

FIG. 10 shows apparatus for testing the closure.

In its broad aspect of my invention, I provide a closure comprising a substantially tubular member having at least one open end and formed of a polymeric composition exhibiting plastic memory. The closure is fabricated to desired shape and size in a heat stable condition, and dimensionally altered to a heat unstable condition as a preform which is capable of returning to its last existing shape and size upon the application of heat. The interior wall of the closure is provided with a network of protuberances preferably annular ribs, formed integrally with the closure and extending from the wall, described hereinafter in greater detail. When the closure as a preform is telescoped with another article or object (e.g., cable) and heat applied to the preform so that it returns to its original size, the protuberances provide gripping and sealing action. It will be observed that because the protuberances are formed integrally with the closure and of the same polymeric composition the protuberances expand or contract with the shell of the closure and consequently provide an integral grip and seal not otherwise achieved. In the preferred embodiment, the annular ribs are substantial normal to the longitudinal axis of the closure.

Figure 1:
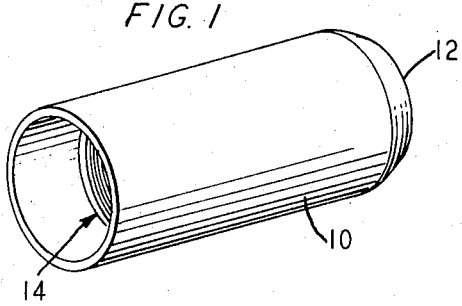
FIG. 1 is a perspective view of a closure falling within the scope of this invention.
Figure 2:
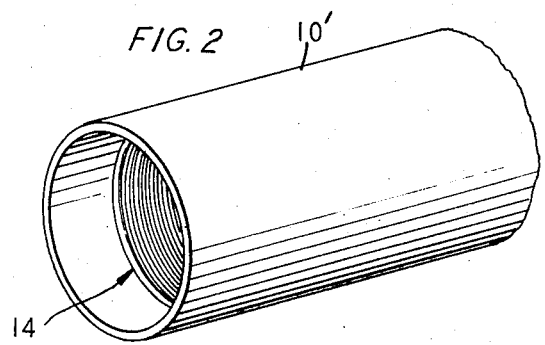
FIG. 2 shows the closure of FIG. 1 expanded to the heat unstable preform.
Figure 3:
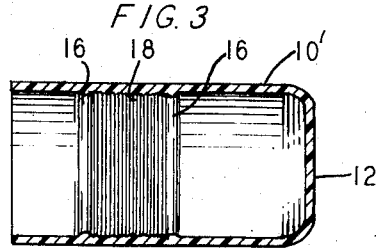
FIG. 3 is a longitudinal cross-section of the closure.

Referring to the drawings wherein like reference numerals designate similar parts throughout, there is shown in FIGS. 1–6 an end cap closure 10 especially suitable for covering the end of a cable. The end cap 10 is of substantially cylindrical form closed or capped at one end 12. From the opposite open end one can observe a network of annular protuberances as projecting ribs indicated generally by the numeral 14 (see FIG. 1). In the preferred embodiment, the annular ribs are not all uniform as to the width of the flat and the depth of the rib. As more clearly illustrated in FIG. 3, the interior wall of closure 10 is provided with a pair of circumferential spaced relatively wide rings 16 and a plurality closely spaced, non-helical, circumferential threads 18 between the spaced rings. Thus rings 16 have a relatively wider flat and greater depth than threads 18. As shown in FIG. 3, the ribs begin inwardly from the marginal edge of the open end of end cap 10, and extend inwardly toward the capped end 12 for a distance less than the complete length of the end cap. The number of rings may vary, and the closure may include only one ring at either end of the threads, or intermediate the threads, or may include three or more rings. This unique construction is possible because of the combined and complementary functions of the rings and threads. When the end cap is fitted over the cable, the threads serve as a sealant and further bridge any knicks or gaps in the periphery of the insulation, and the rings improve the gripping of the end cap.

Figure 4:
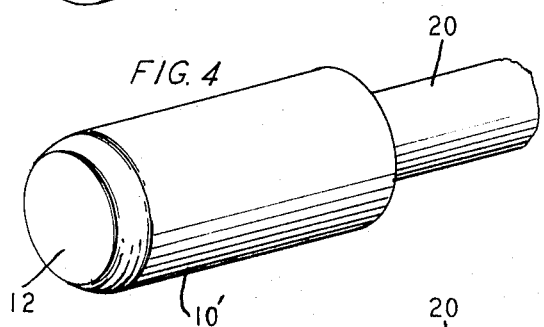
FIG. 4 is a perspective view of the closure as a heat unstable preform telescoped with a cable.
Figure 5:
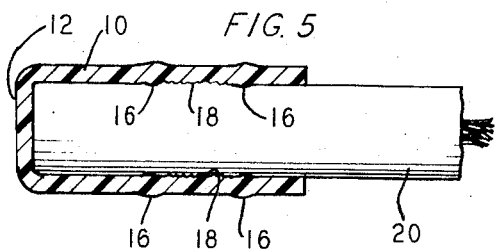
FIG. 5 is a longitudinal view of FIG. 4 with the preform shown in cross-section.
Figure 6:
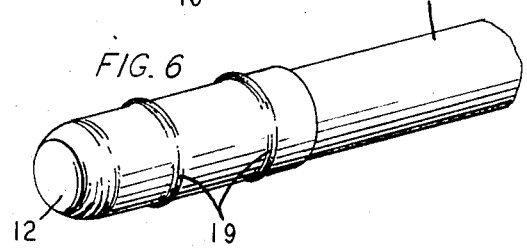
FIG. 6 is a perspective view showing the finished composite of FIG. 3.

FIGS. 4, 5 and 6 show how the end cap is used for protecting the cable end. A cylindrical end cap or closure 10 with one open end is first molded to the desired size such that its diameter is substantially the same or slightly smaller than the diameter of the cable to be encapsulated. The mold core is provided with annular internal or female ribs so as to form the complementary annular external ribs on the internal wall of the end cap. The hot molded cap is expanded by pneumatic or hydraulic pressure while confining the cap within a matrix of the size to which it is desired to expand the cap. The expanded cap is then chilled so as to retain this expanded shape in a heat unstable condition, and this expanded form is commonly referred to as a preform $10^1$. FIG. 1 shows the cap as first molded, and then expanded to the preform $10^1$ as shown in FIG. 2. The preform will retain this shape and its memory property for a long period so that it can be utilized by the cable manufacturer at any time. The preform is inserted over the cable 20, as shown in FIGS. 4 and 5, and when heat is applied to the preform, the preform contracts to its original heat stable form thereby snugly gripping the cable (see FIG. 6). The relatively wide and deep rings 16 provided still another advantage in that because of their large size they provide a built-in indicator which appears when the end cap is firmly anchored to the cable and a secure seal has been achieved, as shown at 19.

Figure 7:
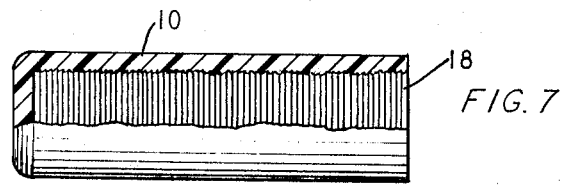

Another embodiment of the end cap is shown in FIG. 7. Here annular threads 18 only are provided substantially the complete length of the inside wall of the cap 10. Where desired, the threads 18 may extend for a shorter distance or they may be inset from the marginal edge of the cap. According to the alternate embodiment shown in FIG. 8, the inside wall of the cap 10 is provided with a plurality of spaced apart rings 16. The threads are omitted from this embodiment. The number of rings may vary depending largely upon the size of the cap and the article to be covered, but usually two or three rings is sufficient.

Figure 9:
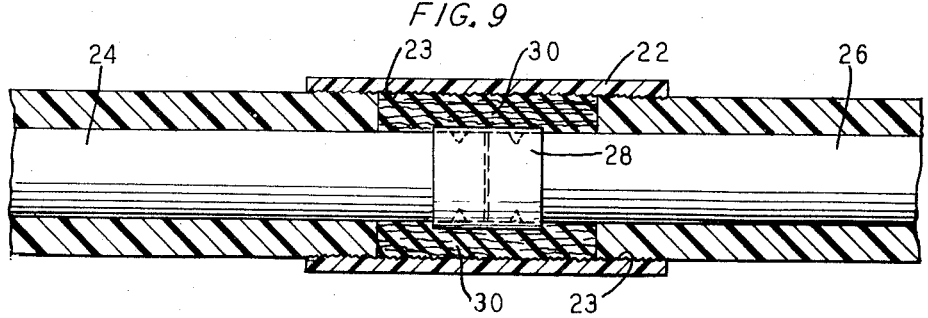
FIG. 9 is a longitudinal view of a cable splice and a heat unstable preform in cross-section in position over the splice to form a composite in accordance with the invention.

FIG. 9 illustrates a closure adaptable for encapsulating a cable splice. According to this embodiment, the cylindrical closure 22 is open at both ends, and the inner wall is provided with circumferential projecting threads 23, as explained above. The threads 23 extend substantially the complete length of the closure. The closure is converted to the preform and then slipped over the splice between two cables 24 and 26 which have been connected with a crimp type connector 28 and covered with a splicing tape 30. Heat is applied to the preform and it returns to its substantially original size thereby firmly enclosing the splice.

It will be observed that the closure of my invention provides several advantages. The sealant is omitted and therefore one operation in the manufacturing process is eliminated. Moreover, a sealant may deteriorate and ultimately act as a lubricant, in which case the closure can slip thereby exposing the cable interior to moisture. More importantly, the closure of this invention is superior in performance to a closure utilizing a hot melt sealant, as demonstrated by the tests below.

Tests were designed to evaluate the holding strength of end caps made in accordance with this invention having molded-in projecting ribs versus conventional (commercially available) end caps utilizing a hot melt sealant. The tests apparatus was set up substantially as shown in FIG. 10. Compressed dry nitrogen gas from cylinder 32 is passed to a manifold 34 having separate outlets 36 each provided with a stopcock 38. End cap 40 is sealed over a pipe or cable section 42. For all the tests, Samples 1 through 6, inclusive, are end caps having a commercial sealant, and Samples 7, 8 and 9 are end caps made in accordance with this invention. End cap Sample 7 had the molded threads only (embodiment of FIG. 7), end cap Sample 8 had the molded rings only (embodiment of FIG. 8), and end cap Sample 9 had the molded combination of rings and threads (embodiment of FIGS. 1–6). Gas leakage was determined visually, and when an end cap failed, the stopcock to that outlet was closed and the test continued.

Test No. 1

In Test No. 1, conducted in open air at 21° C., the end caps were sealed over a galvanized pipe having an inside diameter of three-fourths inch. Nitrogen gas was applied to the end beginning at atmospheric pressure, and the pressure raised 10 psi every 10 minutes until failure. Table 1 below shows the pressure of dry nitrogen to blow the cap off.

Table I

Pressure Test

| Sample | Pressure of $N_2$, psi |
|---|---|
| 1 | 100 |
| 2 | 200 |
| 3 | 220 |
| 4 | 90 |
| 5 | 220 |
| 6 | 100 |
| 7 | 270 |
| 8 | 290 |
| 9 | 290 |

Test No. 2

In this test, the end caps were sealed to a 15 KV power cable section (single conductor) provided with a polyvinyl chloride jacket. The manifold and outlets with end caps were immersed in water and placed in an electrically heated oven. The nitrogen gas was maintained at a constant pressure of 30 psi. The test was started at room temperature, and the temperature raised at the rate of 10° C. per hour. Table II below shows the temperature at which the end caps failed.

Table II

Temperature Test

| Sample | Temperature, °C. |
|---|---|
| 2 | 54 |
| 4 | 50 |
| 5 | 74 |
| 9 | 90 |

Test No. 3

For this test, the end caps were sealed over neoprene jacketed 600 volt cable sections. As in Test No. 2, the test apparatus was immersed in water, and the temperature was maintained constant at 78° C. Also, the nitrogen gas pressure was held constant at 50 psi. Table III below shows the time elapsed for failure.

Table III

Time Test

| Sample | Time, minutes |
|---|---|
| 1 | 5 |
| 2 | 15 |
| 4 | 10 |
| 5 | 25 |
| 9 | 90 |

The foregoing tests clearly illustrates the advantages and superior performances of a closure made in accordance with this invention.

I claim:

1. A closure formed of a polymeric composition exhibiting plastic memory comprising a substantially tubular member having at least one open end and the interior wall provided with a network of protuberances formed integrally with the closure and of the same polymeric composition and being substantially normal to the longitudinal axis of the closure, said closure including said protuberances characterized by being capable of changing dimensions between a heat stable condition and a heat unstable condition.

2. A closure according to claim 1 wherein said protuberances comprise annular projecting ribs.

3. A closure according to claim 2 wherein said ribs comprise closely spaced, circumferential threads and at least one circumferential ring having a relatively wider flat and greater depth than said threads.

4. A closure according to claim 1 wherein said polymeric composition comprises a cross-linked polyolefin.

5. A closure according to claim 1 wherein said polymeric composition comprises a cross-linked polyethylene.

6. A closure formed of cross-linked polyolefin exhibiting plastic memory comprising a substantially tubular member having at least one open end and the interior wall provided with spaced circumferential rings and a plurality of circumferential threads disposed between said rings, said rings and said threads projecting from said interior wall and formed integrally with the closure, said rings having a relatively wider flat and greater depth than said threads, said closure characterized by being capable of changing dimensions between a heat stable condition to a heat unstable condition.

7. A closure according to claim 6 wherein said polyolefin comprises a cross-linked polyethylene.

* * * * *